April 18, 1944. G. H. DOWTY 2,346,667
RESILIENT SUSPENSION DEVICE
Filed Jan. 11, 1940 2 Sheets-Sheet 1
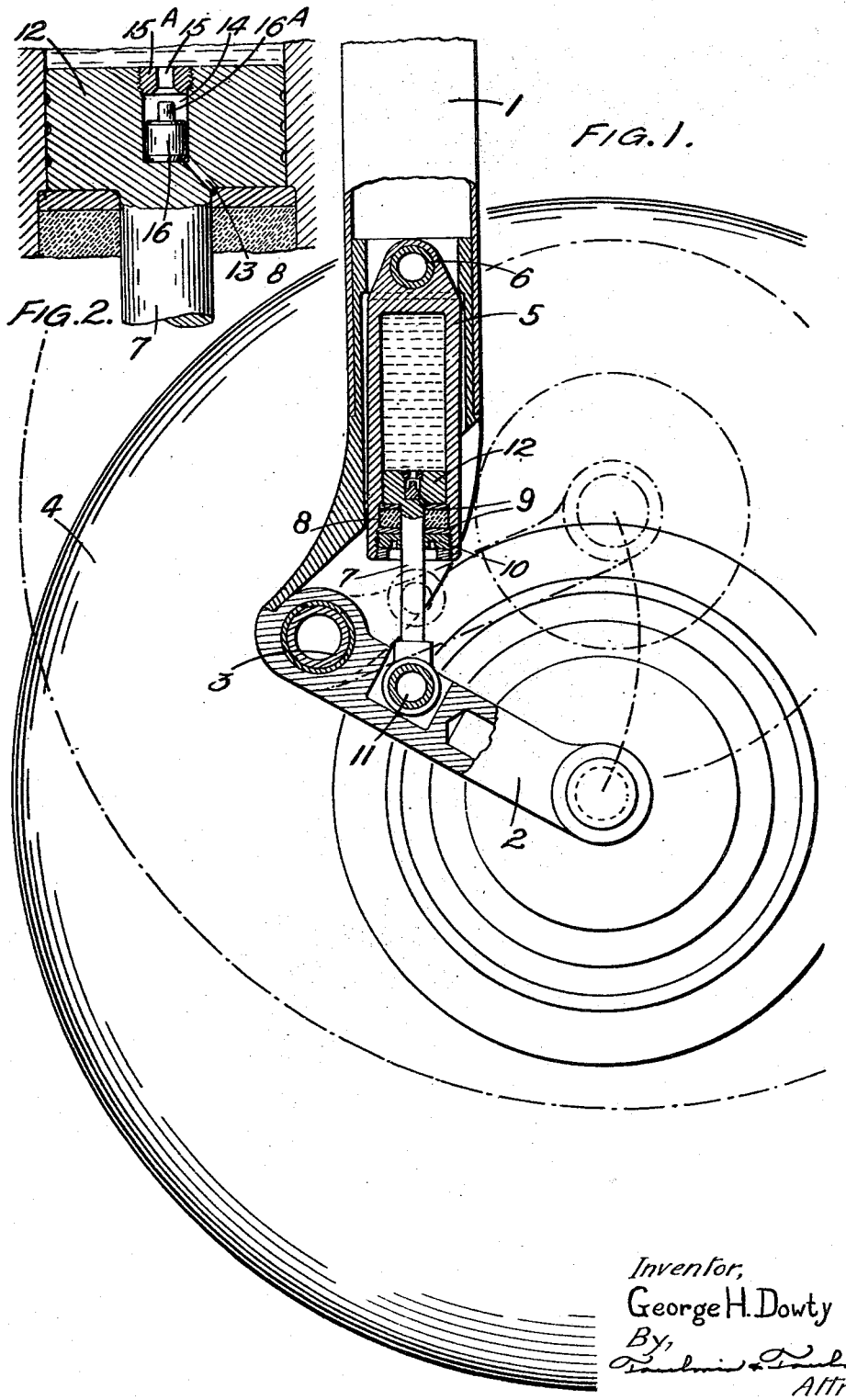
Inventor,
George H. Dowty

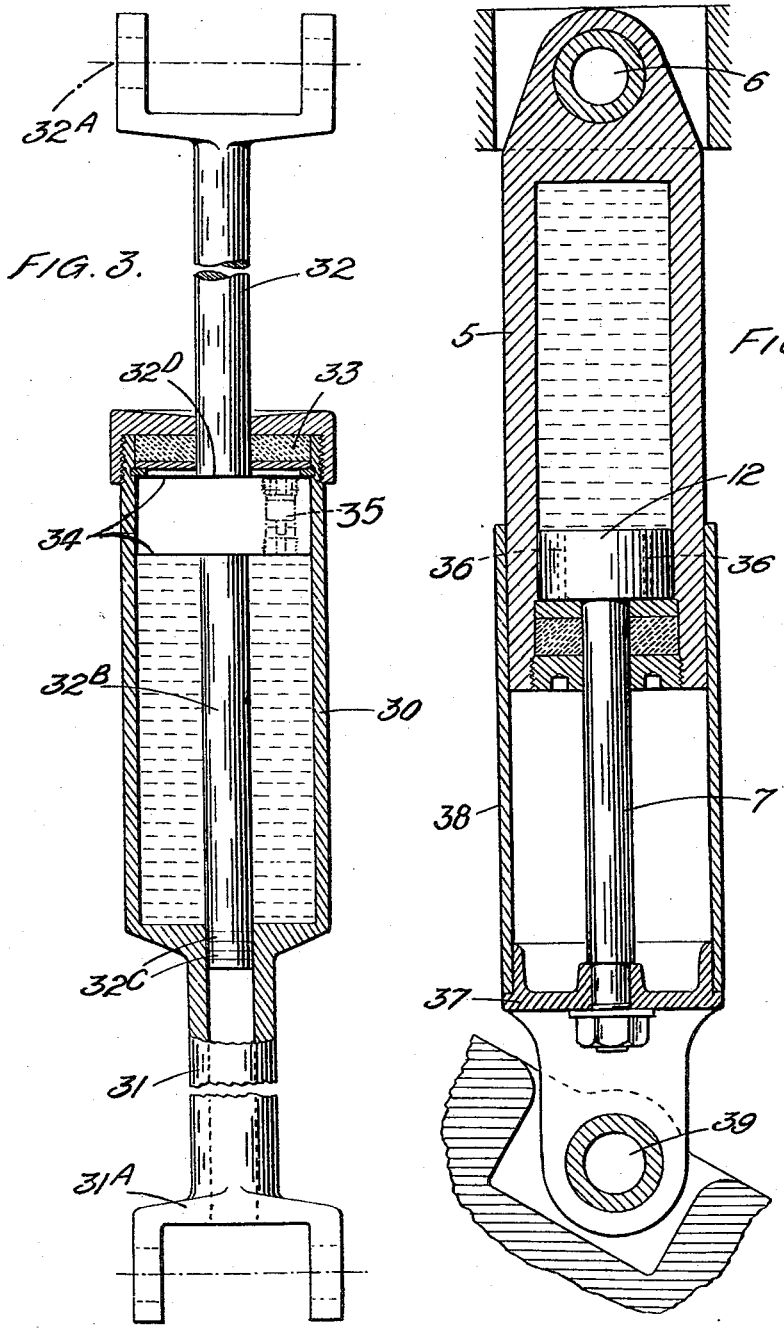

Patented Apr. 18, 1944

2,346,667

UNITED STATES PATENT OFFICE 2,346,667

RESILIENT SUSPENSION DEVICE

George Herbert Dowty, Cheltenham, England

Application January 11, 1940, Serial No. 313,399
In Great Britain January 17, 1939

5 Claims. (Cl. 267—64)

This invention relates to means for affording resilient resistance to motion including almost purely resilient resistance or resilient resistance together with energy dissipation or damping. The purpose of such a device is for shock absorption, either simply resiliently, or resiliently and with energy dissipation.

It is the principal object of this invention to provide means by which a body of liquid can be compressed by changing the volume of the space in which the liquid is contained without decreasing the volume of the liquid so as to use the expansion or contraction of the liquid for shock absorption in a satisfactory manner; and additionally and optionally to use it for shock damping. The invention relies on the elasticity of compressed liquid to supply the resilient resistance, and employs simple apparatus for enabling this to be done.

Optionally the liquid is placed in the chamber under initial compression and means is applied to compress elastically the liquid in the chamber.

It is a further object to provide means within the chamber for damping the action of the compression means while at the same time securing shock absorption.

It is a further object of this invention to utilize liquid under relatively very high compression e. g. of the order of fifty thousand pounds per square inch, for shock absorption. Contrary to the general impression heretofore had in the art, I have found that placing liquid under such great compression results in a medium, when confined in a chamber and progressively compressed, which acts as a shock absorber of very simple and compact construction in which only one high pressure chamber is necessary, and within that chamber the whole of the liquid used can be accommodated. It follows that energy dissipation can be provided for by means contained within the compression chamber. Likewise it follows that practically the whole of the liquid can be subjected to flow resistance and therefore the maximum quantity of energy dissipation for a given quantity of liquid (and therefore size of device) is achieved.

It is the object of this invention to utilize compressed liquid as a shock absorber medium and to utilize said liquid both as a shock absorber medium and as a damper.

Devices according to this invention are intended to be used with pressures of the order of twenty thousand pounds per square inch, fifty thousand pounds per square inch or even greater. At these high pressures the viscosity greatly increases and thus increases the comparative damping effect at high pressures. Put in another way, the flow resistance and therefore damping effect, increases per unit of deflection at a given rate, in proportion to the amount of deflection. This last advantage is only achieved in full if the whole of the liquid used is caused to be subjected to flow resistance.

By "liquid" 'is meant a substance which is stable liquid in the condition to which it will be subjected in use. The word "liquid" is to be distinguished from "gas" or "vapour." It has been found that suitable liquids include those which are used in hydraulic actuating systems or in oleo-pneumatic aircraft shock absorbers and they are in the nature of thin light oils and oil mixtures; this does not exclude the possibility of other liquids being employed, such as n-pentane.

According to one aspect of the invention, the movements of the plunger cause the liquid to be displaced through resistance passage means within the chamber so that the inward movements of the plunger relative to the chamber are resisted by liquid flow resistance as well as being resiliently resisted. Preferably the plunger carries a damping head which sweeps the chamber and the flow resistance means are comprised by or in this damping head.

The invention includes an elaboration of this last feature involving optionally a certain construction of valve which will be described. The arrangement is preferably such that in the course of a full working stroke of the damping head the piston thereon sweeps practically the whole liquid-filled volume within the chamber with the consequence that practically all the liquid is displaced through the flow resistance means in such stroke.

The damping means in some cases may comprise simply the damping head itself which may have through ports or which may merely fit the cylinder loosely enough to provide a required degree of leakage.

Further, in order to obviate undesired bending loads in the resilient device, which loads it may not be well adapted to bear, it is a subsidiary feature of the invention that the device is so constructed that its connections to parts or elements between which it is required to work, are in the nature of pin or ball joints, i. e. are such as to afford angular freedom so that it is not possible for the connected parts to apply any, or any substantial, bending loads in the resilient device.

Three practical applications of the invention will now be described by way of example, with the aid of the accompanying drawings. The first of these is illustrated in Figures 1 and 2 which are respectively a sectional elevation and an enlarged sectional scrap view, the second is described in relation to Figure 3 which is a part sectional elevation, while Figure 4 is a part sectional elevation showing the third embodiment.

Referring to Figures 1 and 2, the invention is here shown applied as a shock-absorber to an aircraft undercarriage. The elements between which the device is to be operative are an undercarriage leg or structure represented at 1, and a lever 2 pivoted thereto on a bearing 3 and carrying at its outer end a landing wheel 4. It should be evident that resilient yielding under load and rebound involve rising and falling movements of the wheel 4, and therefore the lever 2 is required to swing. For the purpose of shock absorption, such swinging is to be resisted resiliently and by way of damping. To this end a shock absorber device is provided which is constructed according to the invention. It consists of a robustly constructed steel cylinder 5 pivotally attached by a pin joint at 6, to the leg 1 which, being hollow, can accommodate the cylinder 5. The lower end of the cylinder 5 is closed by a gland through which is slidable in a liquid-tight manner a plunger 7. The gland in the present proposal comprises a packing 8 of rubber or other resilient material constrained between upper and lower annular washers 9, the whole being held in place and initially loaded in compression by an annular gland nut 10 screwed into the bottom end of the cylinder 5.

The plunger 7 is connected by a pin joint 11 to the lever 2, at its outer end. At its inner end the plunger 7 is integral with or carries a damping head 12, which slides in the cylinder 5. It is to be understood that the function of the damping head 12 is not primarily to effect compression in the liquid with which the cylinder 5 is filled; the damping head 12 will, of course, produce a pressure-difference across itself, but this pressure-difference is subordinate to, and will normally be of a very much smaller order than, the pressure changes produced within the cylinder 5, by the volumetric displacement attributable to the plunger 7. The primary function of the damping head is energy dissipation; with that object a liquid flow resistance passage connects the two sides of the damping head 12, and this can best be followed by an inspection of Figure 2. The resistance passage comprises one or more ducts 13 from the underside of the damping head leading into a cylindrical bore 14 which is partially closed by a screwed-in plug 15A having a central aperture 15. Within the bore 14 there is slidable a valve-like element 16 of cylindrical external shape. When in the "down" position the element 16 rests on the bottom floor of the bore 14, and when in the "up" position a small head 16A partly enters and therefore partly blocks the aperture 15, the inner entrance to which may be somewhat tapered. The element 16 has a clearance between its periphery and the wall of the bore 14, which is carefully selected because this is the clearance which in the main, determines the flow resistance through the damping head 12. The resistance passage constituted by the clearance is thus an annular passage, and it is found more practicable to arrive at a desired flow resistance by affording such clearance, than it would be, for example, to drill a very minute hole with accuracy. Moreover, it should be evident that the element 16 will be carried upwardly or downwardly according to the sense of liquid flow, and such movement may serve to prevent the lodging of foreign matter in the clearance. In any case it is extremely improbable that foreign matter would produce any substantial stoppage of such an annular clearance. The movements of the element 16 also (by the cooperation of the head 16A with the aperture 15) provide more resistance to flow in an upward than a downward sense, and therefore produce a greater damping effect to downward movements of the damping head 12 than to upward movements thereof, so far as the inherent resistance to flow of the resistance means is concerned.

It should now be clear that an upward movement of the lever 2 relative to the leg forces the plunger 7 and associated damping heads 12 into the cylinder 5. This compresses the liquid within the cylinder, and thus upward movements of the lever 2 are resiliently resisted. In its upward movement, the damping head 12 displaces liquid from above to below such displacement being subjected to the resistance of the passage means through the damping head 12, by which energy dissipation is caused. In the course of a complete inward stroke of the plunger 7, practically the whole of the liquid contained in the cylinder 5 will have been displaced through the damping head 12.

Turning now to Figure 3, there is here illustrated a resilient device making use of a differential area plunger. In this figure, the cylinder 30 has an axial extension in the form of a sleeve 31, terminating in a fork 31A for a pivot attachment. A plunger 32 enters the cylinder 30 through an endplate and gland 33 of the same general character as that of Figure 1. The plunger 32 has at its outer end a fork 32A for a pivot attachment. The plunger 32 forms in effect a "differential piston." Its inner end 32B, carrying packing-rings 32C, slides in the sleeve 31. The plunger where it slides in the assembly 33 is of slightly greater diameter than that of its end part 32. The change in diameter is at a shoulder 32D, which, as well as being, in effect, the working area of the plunger, may also act as an abutment and support for a damping head 34 which is mounted rigidly on the plunger 32 and is otherwise practically the same as the damping head 12 in Figure 1. The whole available volume within the cylinder 30 is filled with liquid, all of which is therefore available for subjection to flow resistance as in the previous cases. The forks 31A, 32A, being connected to the two parts required to be resiliently related, movement towards each other of such parts deflects the shock absorber in forcing the plunger 32 through the cylinder 30, so that product of the area representing the difference in sectional area between the thicker and thinner parts of the plunger, and the length of travel, is the volume displaced by the plunger. The support of the plunger in two localities relative to the cylinder 30, makes it possible for a comparatively slender plunger to be employed which if not so supported, might too easily be bent or buckled.

In regard to the damping action of the damping head 34 and its resistance passage, indicated generally in broken lines at 35, it is of interest to note that, for a given rate of shock-absorber deflection (i. e. of relative movement between vehicle or aircraft, and sub-structure), the rate of flow through the resistance passage varies with the position of the damping head. At the commencement of a compression stroke the rate of flow per rate of deflection is low relatively to the rate of flow per rate of deflection towards the end of the compression stroke by virtue of the compressibility of the liquid. This is advantageous in that it indicates that the comparative damping effect is correspondingly higher as the end of a stroke is approached.

Referring now to the arrangement shown in Figure 4, the general assembly of the shock absorber unit is along the lines of the unit shown in Figure 1 and therefore, with the exception of certain additional features, similar reference numerals have been employed to designate corresponding parts. In this case the resistance passage means are simply the ports shown dotted at 36 and the outer end of the plunger 7 carries an end cap 37 which in turn locates a supporting sleeve 38 slidably co-operating with the cylinder 5. The sleeve 38 slidably co-operates with the cylinder 5 for bracing the projecting part of the plunger 7; likewise the damping head 12 being a sliding fit in the cylinder 5, also tends materially to resist bending and therefore there is provided a compact unit inherently resistant to bending without being made unduly heavy. In addition to the pin joint 6 of the cylinder 5 there is a similar arrangement provided on the end cap 37 incorporating the pin joint 39, by means of which connections the unit can be pivotally connected between two relatively swinging parts.

It will be understood that I desire to comprehend within my invention such modifications as come within the scope of the claims and the invention.

I claim:

1. A resilient unit for insertion between members movable relative to each other, said movement being resiliently resisted by the compression of liquid filling a chamber having a liquid compressing member therein which partitions the chamber and is operable to vary the volume thereof, and which compressing member obtains movement within said chamber for damping relative movement between said movable members by displacement of the liquid between opposite ends of the partitioned chamber through a resistance passage disposed entirely within said liquid compressing member, said resistance passage consisting of one or more parts at least one of which includes a shuttle valve affording a differential of resistance as between damping on compression and rebound.

2. A resilient unit for insertion between two relatively movable members including a liquid filled chamber, a piston slidable within said chamber having an actuating rod extending therefrom, movement of said piston and rod within said cylinder varying the total cylinder volume to cause elastic compression or expansion of a liquid filling said cylinder, said liquid flowing from one side of the piston to the other through a resistance passage having a fixed size during the liquid compression stroke and a lesser fixed size during the liquid expansion stroke throughout the period of the changing chamber volume for liquid springing suspension with consequent damping.

3. A resilient unit for insertion between two relatively movable members to afford resilient connection therebetween comprising a pressure-tight chamber, a plunger slidably extending into the chamber to afford resilient resistance due to the elastic restoring forces of liquid filling the maximum available space in the chamber and compressible by plunger movement under axial load, a head on the plunger and slidably fitting the bore of the chamber, flow-resistance passage means carried by the plunger and constituted by a port for liquid to pass from side to side of the head, and shuttle valve means in said port to exercise damping control different in one direction of plunger travel from that exercised in the other.

4. The improved resilient unit as set forth in claim 3, in which the flow-resistance passage includes an annular clearance between the wall of the port and the shuttle valve.

5. A resilient unit for insertion between two relatively movable members including a liquid filled chamber, a piston slidable within said chamber having an actuating rod extending therefrom, movement of said piston and rod within said cylinder varying the total cylinder volume causing elastic compression or expansion of a liquid filling said cylinder, said liquid flowing from one side of the piston to the other in both directions of movement of the piston and through a resistance passage having a predetermined resistance effect during the liquid compression stroke and a greater predetermined resistance effect during the liquid expansion stroke throughout the period of the changing chamber volume for liquid spring suspension with consequent damping.

GEORGE HERBERT DOWTY.